Patented Apr. 10, 1934

1,954,390

UNITED STATES PATENT OFFICE 1,954,390

GLAZE OR ENAMEL

Kenneth E. Long, Cleveland, Ohio, assignor to The Harshaw Chemical Company, Cleveland, Ohio, a corporation of Ohio No Drawing. Application April 30, 1932, Serial No. 608,569

13 Claims. (Cl. 106—36.2)

When titanium oxide and antimony compounds have been employed as constituents of compositions for glazes or vitreous enamels, there has been much difficulty from the formation of dark-colored specks which are detrimental to the appearance of the finished product. A composition of matter which can contain titanium and antimony and yet avoid such erratic results is accordingly an important desideratum in the art, and highly desirable.

To the accomplishment of the foregoing and related ends, the invention, then, comprises the features hereinafter fully described, and particularly pointed out in the claims, the following description setting forth in detail certain illustrative embodiments of the invention, these being indicative, however, of but a few of the various ways in which the principle of the invention may be employed.

In the known practice, the ingredients of a frit including titanium dioxide, and an antimony compound, such for instance as antimony oxide, have been mixed and heated to fusion. In careful study of such process, I have found that titanium dioxide and antimony trioxide when heated together by themselves react at rather low temperatures to form a dark-colored pigment, corresponding to the dark colored specks which occur in enamel frits using antimony compounds and titanium dioxide. I have found also that if an antimony compound of higher valence be heated with titanium dioxide, the temperature must be raised to about 800° C. before the dark colored pigment appears, and that in general the higher oxides of antimony all have to be reduced by heat before the dark pigment is formed. I have also found that sodium titanate, $Na_2TiO_3$, and sodium antimonate, $NaSbO_3$, can be heated together without formation of the objectionable black pigmentation, or what amounts to the same thing—an intimate mixture of titanium dioxide, antimony oxide, sodium nitrate and sodium hydroxide or carbonate in the proper proportions may be heated together without formation of the dark colored substance. In general, a desirable composition can be had which is not subject to erratic coloration, by having or producing in place the antimony component in the pentavalent state in combination with a base, specifically an alkali, as sodium, and with the titanium dioxide satisfied by enough base or alkali to prevent decomposition of the antimonate by removal of base or alkali, and that furthermore, the ratio of base soda to titanium can be much less than indicated by the formula $Na_2TiO_3$, corresponding to the highly acid titanate such as $Na_2Ti_4O_9$. With a base in excess of the amount to combine with the antimony to form a met-antimonate, the ratio of antimony to titanium can vary quite widely; and for instance, there may be sodium met-antimonate and sodium poly-titanate in which there is a molecular ratio of sodium oxide to titanium dioxide as low as 1 to 6, while the upper limit may be determined by the total sodium desired in the frit. Conformable with the invention, the antimony and titanium compounds with sufficient alkali and oxidizing agent are reacted under controlled conditions separate from the other frit ingredients, and the resultant material is then added to the frit mixture. The final composition of the frit is essentially the same as if all the components had been smelted together. Thus, by adding to the raw frit only compounds of antimony and titanium which do not form dark colored substances when heated together, there is an avoidance of objectionable dark colored speck formation under all of the range of usages of glazes and vitreous enamels, whether for application on porcelain and the like or on metal.

Illustrative combinations in accordance with the invention are sodium titanate and sodium antimonate, sodium acid titanate, such as $Na_2Ti_4O_9$, and sodium antimonate; a pre-calcined mixture of titanium dioxide and an alkali; a pre-calcined mixture of titanium dioxide, antimony oxide, alkali, and an oxidizing agent. Sodium titanate or sodium acid titanate may be prepared by heating alkali or alkali carbonate with titanium oxide to 600–1000° C. A pre-calcined mixture of sodium antimonate, titanium dioxide and alkali may be prepared by heating the mixture to 600–1000° C. A pre-calcined mixture of titanium dioxide, antimony oxide, alkali, and an oxidizing agent may be prepared by similarly heating to 600–1000° C. These mixtures or compositions may be made up in any proportion desired for the finished enamel frit.

Titanates can be readily prepared, as for instance, a mixture of 43 parts of $TiO_2$ and 57 parts of NaOH heated together at 800° C. to form a normal sodium titanate; or, a mixture of 80 parts of $TiO_2$ and 20 parts of NaOH heated together at 800° C. to form an acid sodium titanate.

Some illustrative examples of proportions are as follows:

I. A mixture of 47.6 parts of sodium titanate and 52.4 parts of sodium antimonate heated together to 1000° C.

II. A mixture of 72.7 parts of sodium acid titanate $Na_2Ti_4O_9$ and 23.7 parts of sodium antimonate heated together to 800° C. and forming a white powder.

III. A mixture of 52.5 parts of $TiO_2$, 13.2 parts of NaOH, and 34.3 parts of sodium antimonate heated together to 800° C., forming a white powder.

IV. A mixture of 34.4 parts of $TiO_2$, 41.2 parts of $Sb_2O_3$, 14.3 parts of NaOH, and 10.1 parts of $NaNO_3$, heated together to 800° C., forming a white powder.

V. A mixture of 14.5 parts of $TiO_2$, 58 parts of $Sb_2O_3$, 10.5 parts of NaOH, and 17 parts of $NaNO_3$ heated together to 800° C., forming a white powder.

Thus any ratio of antimony to titanium desired may be used, with appropriate amounts of soda or alkali in accordance with the general limits indicated.

Other modes of applying the principle of the invention may be employed, change being made as regards the details described, provided the features stated in any of the following claims, or the equivalent of such, be employed.

I therefore particularly point out and distinctly claim as my invention:—

1. A composition of matter for glaze or enamel use, comprising an available reactive base and antimony in ratio at least equivalent to that in antimonate, titania, and enough of such base to combine with the titanium.

2. A composition of matter for glaze or enamel use, comprising sodium and antimony in ratio at least equivalent to that in sodium antimonate, titania, and enough sodium to combine with the titanium.

3. A composition of matter for glaze or enamel use, comprising antimony, titanium, and a reactive base in excess of that to combine with the antimony to form a met-antimonate and in which the ratio of antimony to titanium can vary.

4. A composition of matter for glaze or enamel use, comprising antimony, titanium, and sodium in excess of that to combine with the antimony to form a met-antimonate, and in which the ratio of antimony to titanium can vary.

5. A composition of matter for glaze or enamel use, comprising sodium met-antimonate, and sodium poly-titanate in which the molecular ratio of sodium oxide to titanium dioxide may be as low as 1 to 6.

6. A composition of matter for glaze or enamel use, comprising sodium antimonate and a sodium titanate.

7. A composition of matter for glaze or enamel use, comprising a calcined mixture of sodium antimonate and a sodium titanate.

8. A composition of matter for glaze or enamel use, comprising a calcined mixture of titanium dioxide, antimony oxide, alkali, and an oxidizing agent determining high valence for the antimony.

9. A composition of matter for glaze or enamel use, comprising a mixture of about 47.6 parts of sodium titanate, and about 52.4 parts of sodium antimonate heated together to about 1000° C.

10. A compostion of matter for glaze or enamel use, comprising a mixture of about 72.7 parts of sodium acid titanate $Na_2Ti_4O_9$, and about 23.7 parts of sodium antimonate heated together to about 800° C.

11. A composition of matter for glaze or enamel use, comprising a mixture of about 52.5 parts of titanium dioxide, about 13.2 parts of sodium hydroxide, and about 34.3 parts of sodium antimonate, heated together to about 800° C.

12. A composition of matter for glaze or enamel use, comprising pentavalent antimony in antimonate combination, and titanium dioxide with base sufficient to avoid decomposition of the antimonate.

13. A composition of matter for glaze or enamel use, comprising pentavalent antimony in antimonate combination, and titanium dioxide with soda base sufficient to avoid decomposition of the antimonate.

KENNETH E. LONG.